A. H. C. GIBSON.
AUTOMOBILE.
APPLICATION FILED MAR. 11, 1915. RENEWED DEC. 18, 1918.
1,293,642.
Patented Feb. 4, 1919.
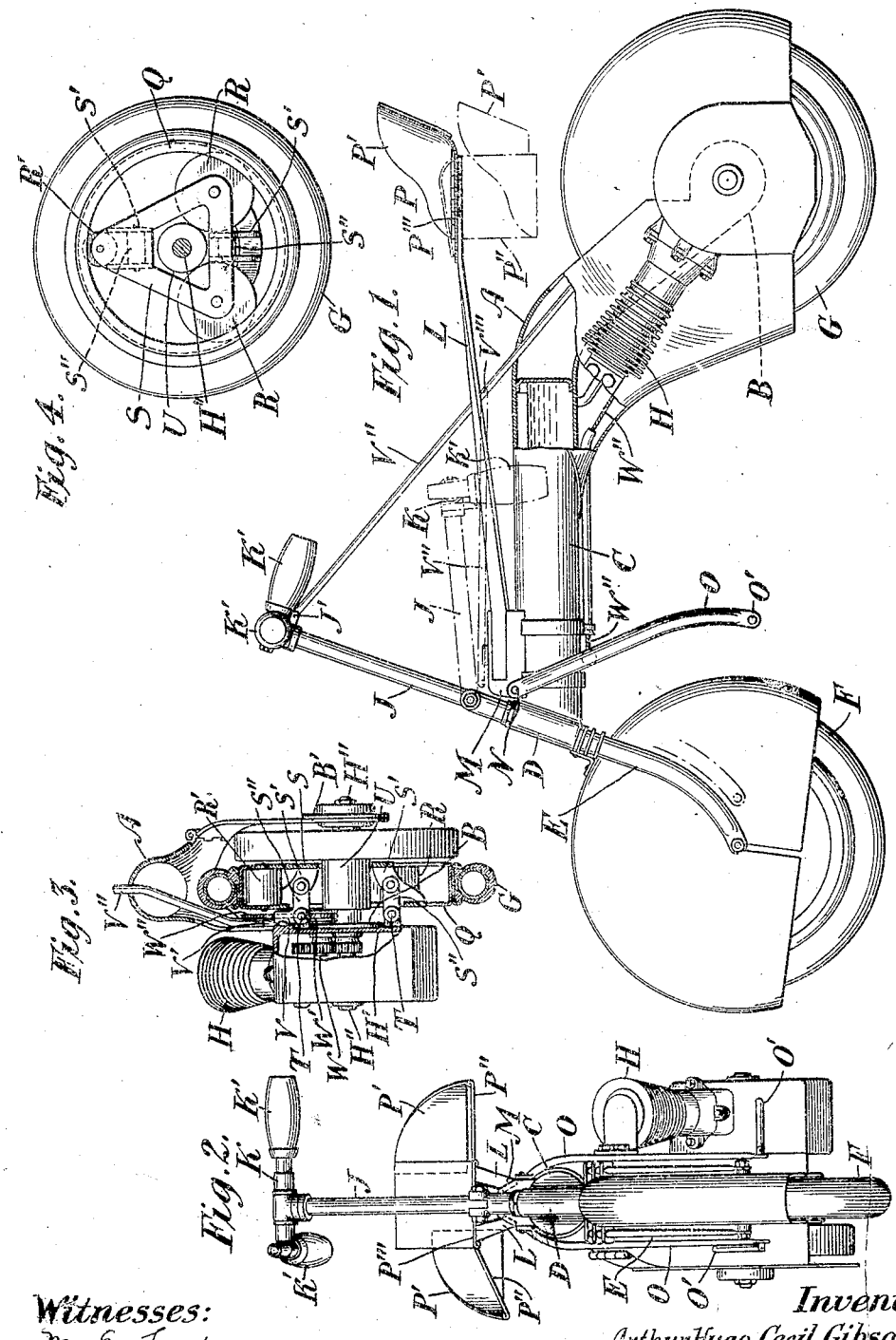
Witnesses:
M. E. Levy
John Darby
Inventor:
Arthur Hugo Cecil Gibson,
By [signature]
his Attorney.

UNITED STATES PATENT OFFICE.

ARTHUR HUGO CECIL GIBSON, OF NEW YORK, N. Y., ASSIGNOR, BY MESNE ASSIGNMENTS, TO THE GIBSON MON-AUTO COMPANY, OF NEW YORK, N. Y., A CORPORATION OF NEW JERSEY.

AUTOMOBILE.

1,293,642.   Specification of Letters Patent.   Patented Feb. 4, 1919.

Application filed March 11, 1915, Serial No. 13,792. Renewed December 18, 1918. Serial No. 267,405.

*To all whom it may concern:*

Be it known that I, ARTHUR HUGO CECIL GIBSON, a subject of the King of Great Britain, and a resident of New York city, county and State of New York, have invented certain new and useful Improvements in Automobiles, of which the following is a specification, reference being had to the drawings herein referred to, which are made a part hereof.

My invention has for its main object an automobile which will carry a person seated thereon, to ride comfortably, and at the same time involving a structure so small, compact and light that the rider can in turn carry the automobile. In the preferred form, the rider sits low, that is, in close proximity to the ground, with the relation of parts such that when moving, his legs are comfortably supported, and when not moving his feet will conveniently rest on the ground substantially as when sitting in a chair, so that while having the machine entirely under control he is at the same time in a posture permitting the handling of a rifle, or otherwise utilizing his hands with perfect freedom.

Attempts heretofore to produce small vehicles have not resulted in anything commercial, except such as are so large and heavy as to preclude their being readily transported, and in no way are they transportable as is possible with my present invention, with the exception of one vehicle heretofore made sufficiently light to be carried, but adapted to transport persons standing thereon. My present invention consists in the combination of parts and features of construction peculiarly adapting such portable vehicle to carry a person seated thereon, and so seated as to afford freedom of control and manipulation as will hereinafter appear.

In the particular embodiment of my invention which is herewith specifically shown and described and illustrated in the drawings:

Figure 1 is a side elevation;
Fig. 2 is a front elevation;
Fig. 3 is a part vertical section of the driving wheel;
Fig. 4 is a side elevation of the driving wheel and mechanism.

In the drawings, A is the main frame; B is the rear wheel support; B' is the hinged portion on one side of the rear wheel support; C is a tank or reservoir portion of the same; D is the steering post housing; E is the front fork; F front wheel; G rear wheel; H is the engine; J is the steering post; K is the handle bar; K' handles; L is the seat spring; M is the seat spring clip; N is a pivot in the seat spring clip to which support and starting levers O are attached; O' is a hinged foot rest; P is the seat; P', P'' are lateral collapsible portions of the seat; P''' being the central fixed portion of the seat attached to the seat spring L.

In the rear wheel, the rim Q is channel shaped, having rollers R—R rolling in said channel guide roller R', engaging said channel, all the three rollers being supported in a frame S, having transverse members S', connected by links S'', pivoted at T to the engine casing H'. The engine-shaft H'' is supported in bearings in the engine casing and in the rear wheel supports B, B', while in the plane of the rear wheel is the roller U driven by the engine.

One link S'' has an arm V, which may be forced away from the engine casing by the wedge V' operated by suitable means, such as the rod V'', and by forcing it away it pivots the links S'', forcing the frame S downward with reference to the rear wheel supports, so that the pulley U on the engine-shaft is lifted out of contact with the rollers R, in which position the engine-shaft will not drive the rollers R, and, in other words, permit the wheel G to revolve free, or, in effect, unclutch the engine from driving.

In the engine casing, a step-down gearing drives the cam or counter-shaft W, to which is attached a ratchet pulley W' and a rope W'', which rope passes under the main frame and is attached to the starting lever O.

The post J is hinged close to the steering housing D, to permit folding backward, while the grips K' are attached by a hinge or socket to the handle bar K, so that they also may be folded into a compact space.

The top of the steering post J has the rod V'' pinned to it at J', while the rod V'' is hinged as at V''', so that by disconnecting the joint J' this rod may be folded downward onto the main frame body portion C.

The seat support spring L is attached to the block M, which is secured to the main frame close to the steering post housing, so that all strains are concentrated at the strong portion of the structure. This seat spring has two members which are horizontal at the end where they engage the seat P, and are twisted obliquely at their forward end where they engage the sides of the block M, so that the strength at the forward end is taken up partially by the strength represented by a stress in the plane of the spring, whereas the gradual twist in these spring members affords more spring as the rear is approached where the stress is transverse or on the flat side of the members.

The seat has two lateral bottom portions P'', which are hinged to the central portion, while the back of the seat is also made in three parts permitting the two lateral portions to fold downward into a compact space.

It will thus be seen that in the form of my invention as illustrated in the drawings and specifically described, the entire structure may be collapsed or folded into a very compact space. This is effected by folding in the handles, folding down the steering post, folding down a section of the clutch operating bar, also folding the foot supports O' against the starting bars O, and folding the sides of the seat.

In the operation of my vehicle, a person sitting on the seat is in such close proximity to the ground that he supports the vehicle with one or both feet, much in the fashion of a camp or field stool. By raising one foot and pressing on the foot rest O', he can pull the starting rope W'', which turns the counter-shaft W by means of the ratchet starting wheel W', and in this manner spins the engine-shaft and starts the engine. This starting of the engine may be done with the handle bar pulled slightly backward, under which condition the rod V' having wedged into the arm V, pivoting the link S', will have raised the driving pulley U out of contact with the rollers R—R. Thereupon the handle bar may be pushed forward, pulling the rod V'' and gradually allowing the pulley U to engage the rollers R, thereby letting the weight of the vehicle and occupant down onto the rollers and through the rollers to the inside of the channel Q on the driving wheel, so that the power of the engine-shaft will be transmitted to the rim of the wheel.

To effect braking, a member attached to the engine or one of the members of the rear bifurcated support, projects into the space below the rollers R, so that when the driving pulley U is raised off the rollers the first movement effects the unclutching, and a further movement in the same direction causes the brake shoe to engage the rollers R, thereby retarding the driving mechanism and the wheel in turn.

The tank portion C of the main frame may be connected in any suitable manner, to the carbureter and engine, while any form of ignition and control for the engine may be used.

It will be seen that the rider is in such a position as to be able to support the vehicle laterally with his foot on the ground, to any extent required, and can start the engine without getting off, and while riding has his legs in a position which will not interfere with the engine or other operating parts. Suitable guards, as shown or otherwise, may surround a portion of the wheels, protecting the driver, as well as the engine parts from mud and dirt.

For accessibility, the rear fork portion B' is hinged so that the same may be removed from the end of the shaft H'', permitting inspection and adjustment or removal of the driving mechanism and the fly-wheel, as well as the removal of the entire rear wheel and engine as a unit, from the rear forks.

Various modifications may be made in detail and in the general arrangement, without departing from the spirit of my invention, but what I claim and desire to secure by Letters Patent is:

1. A portable automobile comprising a front steering wheel, a rear driving wheel in tandem therewith embodying driving mechanism and engine, an interconnecting frame, a seat above the rear wheel and resilient means to support said seat attached in close proximity to the forward end of the frame.

2. A portable automobile adapted for the conveyance of a single person, comprising two wheels in tandem, a seat in close proximity to the wheel base and located substantially above the rear wheel, resilient means for supporting said seat at the forward end of the frame, a tubular frame connecting the two wheels, substantially as described.

3. A folding, one-man automobile comprising a single tube main frame, a steering pillar at the front end of same frame, a bifurcated extension in the rear of said frame, an engine attached to one lateral member of the rear bifurcated portion, a driving wheel and power transmission mechanism supported in the bifurcated extension, and means to raise the engine and frame relatively with reference to the driving wheel.

4. A portable automobile having a single main frame member with bifurcated rear extension, an engine-shaft supported in said bifurcated rear extension, a driving wheel surrounding said engine-shaft, a frame supporting said driving wheel, means for moving said supporting frame relatively with respect to the driving shaft, for the purpose described.

5. A folding, self-propelled vehicle comprising a main frame and two wheels in tandem, a hinged steering post, means connecting with the steering post to clutch and unclutch the driving mechanism, hinged connections for said means, and a folding seat.

6. In a self-propelled vehicle, a front steering wheel, a rear driving wheel, engine and driving mechanism, clutch mechanism associated with the rear wheel, means connected with the handle bar to operate said clutch mechanism, pivoted foot rests and means connected with the foot rests to start said engine.

7. A folding, self-propelled vehicle comprising a main frame and two wheels in tandem, a hinged steering post, means connecting with the steering post to clutch and unclutch the driving mechanism and apply the brake, hinged connections for said means, and a folding seat.

8. A two wheel motor vehicle comprising a frame having a steering post, front forks, a single tubular longitudinal beam or body of relatively large size forming the sole connection between the front and rear wheels and adapted to constitute a fuel tank, and a downwardly extending portion for attachment to a rear wheel.

9. A vehicle frame comprising a body and a rigid projection adapted to support a wheel and having one arm adjustable to permit a ready removal of the wheel.

10. A vehicle frame comprising a body and a fork projection adapted to support a wheel and having one hinge-connected arm to permit a ready removal of the wheel.

11. A vehicle frame comprising a substantially horizontal member, an inclined member extending downwardly therefrom and an arm hinged to the horizontal member and forming together with the inclined member a fork adapted to support a wheel axle.

12. A vehicle comprising a frame, a spring secured to the frame near the front extending backwardly therefrom and a seat secured to the free end of the spring near the rear of the vehicle.

13. A vehicle comprising a frame, flat springs secured at one end to the frame near the front of the vehicle in inclined planes and extending backwardly and upwardly with their free ends twisted into a horizontal plane, and a seat secured to the free ends of the springs near the rear of the vehicle.

14. A vehicle comprising a frame having a substantially horizontal tubular member, a spring block seated on the tubular member near the front of the vehicle, straps for holding the block in position, flat springs secured to the block at one end and extending backwardly therefrom, and a seat secured to the free ends of the springs near the rear of the vehicle.

15. A motor vehicle comprising a frame, a foot rest fork pivotally attached to the frame and foot rest projections extending outwardly from the sections of the fork at their lower ends.

16. A motor vehicle comprising a frame, a foot rest fork pivotally attached to the frame and foot rest projections hinged to and extending outwardly from the sections of the fork at their lower ends whereby the foot rest projections are adapted to fold against the fork sections.

17. A motor vehicle comprising a substantially horizontal body, a steering post having a front wheel fork mounted to turn in the post, a steering post having hinge-connected sections, a handle bar at the top of the post having handle grips, and a motor driven rear wheel.

18. A folding motor vehicle comprising a substantially horizontal body, a steering post housing, a front wheel fork mounted to turn in the post, a steering post having hinge-connected sections extending upwardly from the fork, a handle bar at the top of the rod having hinged handle grips adapted to fold thereon, and a motor driven rear wheel.

19. A folding motor vehicle comprising a body having a substantially horizontal member and an inclined member extending downwardly therefrom at the rear and a hinged arm forming with the inclined member a fork adapted to support a wheel, a steering post housing, a front fork mounted to turn in the housing, a sectional steering post housing extending upwardly from the fork, and a handle bar at the top of the post having hinged handle grips adapted to fold thereon.

20. A folding motor vehicle comprising a body having a substantially horizontal member, a seat resiliently mounted on the body and having a plurality of collapsible sections.

21. A folding motor vehicle comprising a body having a substantially horizontal member, a steering post housing, a front fork mounted to turn in the post, a steering post, a seat resiliently mounted on the body and having a plurality of collapsible sections, said steering post having hinge-connected sections, and a handle bar at the top of the post having hinged handle grips.

22. A motor vehicle comprising a frame, steering means, a driving motor having a casing attached to the frame and a driving shaft, a clutch mechanism, means dependent upon the steering means for operating the clutch mechanism, and a road wheel adapted to be operatively connected to the motor shaft.

23. A motor vehicle comprising a rear wheel and a driving motor therefor, a clutch mechanism, a front wheel, and a steering means therefor adapted to be moved in one way for steering the vehicle and in another way for operating the clutch.

24. A motor vehicle comprising a rear driving wheel, a driving motor therefor, a clutch mechanism, a front wheel, and a rotatable steering post therefor having a hinged extension adapted to be turned for steering the vehicle and to be moved back and forth to operate the clutch.

25. A motor vehicle comprising a driving motor, a clutch mechanism, a steering post having a hinged extension, a clutch rod detachably connected to the steering post and adapted to fold close to the vehicle frame with the steering post extension.

26. A motor vehicle comprising a body having a downwardly extending projection at the rear, an engine and a crank shaft secured to the projection, a wheel having an annular roller race, a frame surrounding the crank shaft, link connected to the engine frame, rollers mounted in the frame and adapted to engage the race and an operative connection between the engine and the rollers.

27. A motor vehicle comprising a body having a downwardly extending projection at the rear, an engine and a crank shaft secured to the projection, a road wheel having an annular roller race, a frame surrounding the crank shaft and link-connected to the engine frame, rollers mounted in the frame and adapted to engage the race, and a driving roller connected to the crank shaft and adapted to engage the rollers in the frame.

28. A motor vehicle comprising a body having a downwardly extending projection at the rear, an engine having a crank shaft and a frame secured to the projection, a road wheel having an annular roller race, a frame surrounding the crank shaft and link-connected to the engine frame, rollers mounted in the frame and adapted to engage the race, and a driving roller on the crank shaft and adapted to engage the rollers in the frame, and means for adjusting the roller frame relative to the engine frame to move the driven rollers into and out of engagement with the driving roller.

29. A motor vehicle comprising a body having a downwardly extending projection at the rear, an engine having a crank shaft, and a frame secured to the projection, a road wheel having an annular roller race, a roller frame surrounding the crank shaft, links connecting the roller frame to the engine frame, a bell crank arm projection from one link and means adapted to act thereon to shift the roller frame.

30. A motor vehicle comprising a body having a downwardly extending projection at the rear, an engine having a crank shaft, and a frame secured to the projection, a road wheel having an annular race, a roller frame surrounding the crank shaft, links connecting the roller frame to the motor frame, a bell crank arm projection from one link and a wedge adapted to act thereon to shift the roller frame and an operating rod connected to the wedge.

31. A motor vehicle comprising a body having a downwardly extending projection at the rear, an engine having a crank shaft, and a frame secured to the projection, a road wheel having an annular race, a roller frame surrounding the crank shaft, links connecting the roller frame to the engine frame, a bell crank arm projection from one link and a wedge adapted to act thereon to shift the roller frame and a steering post having a hinged section operatively connected to the wedge.

32. A motor vehicle comprising a driving wheel having a roller race, a frame, an engine mounted on the frame, a roller frame within the wheel having a plurality of rollers adapted to engage the race, and means for operatively connecting the engine with the rollers.

33. A motor vehicle comprising a driving wheel having a roller race, a frame, an engine mounted on the frame, a roller frame within the wheel having a plurality of rollers adapted to engage the race, and means for operatively connecting the engine with the rollers comprising one or more friction drive rollers.

34. A motor vehicle comprising a driving wheel having a roller race, a frame, an engine mounted on the frame, a roller frame within the wheel having a plurality of rollers adapted to engage the race, a roller connected to the engine and adapted to engage the race, a roller connected to the engine and adapted to engage the rollers of the frame and steering means operatively connected to the roller frame for shifting the rollers into and out of engagement with the engine roller.

35. A motor vehicle comprising a front steering wheel, a steering handle, a rear driving wheel, a driving motor, a clutch mechanism, a brake mechanism, and means dependent upon the steering handle for operating either the clutch mechanism or the brake mechanism.

36. A motor vehicle comprising a body, an engine having a frame attached to the body and driving shaft rotatively mounted in the frame, a road wheel, an interposed friction driving mechanism for operatively connecting the driving shaft to the wheel and supporting the wheel.

37. A motor vehicle comprising a body, a motor having a frame rigidly attached to the body, a driving shaft, a road wheel having an annular driven member, and friction transmission members interposed between the driving shaft and the driven member of the wheel.

38. A motor vehicle comprising a body, a motor having a frame attached to the body and a driving shaft rotatively mounted in the frame, a road wheel having an annular friction track, a rotary friction member on the driving shaft and interposed friction transmission members.

39. A motor vehicle comprising a body, a motor having a frame attached to the body and a driving shaft rotatively mounted in the frame, a road wheel having an annular friction track, a rotary friction member on the driving shaft, and friction transmission rollers interposed between the engine driving wheel and the track.

40. A motor vehicle comprising a body, an engine having a frame rigidly secured to the body, and a crank shaft rotatively mounted in the frame, a road wheel having an annular roller race, a friction transmission member on the crank shaft, and interposed rollers between the transmsision member and the race.

41. A motor vehicle comprising a body, an engine having a frame rigidly secured to the body, and a crank shaft rotatively mounted in the frame, a road wheel having an annular roller race, a friction transmission member on the crank shaft, interposed rollers between the transmission member and the race, and means for throwing the friction transmission members into and out of driving connection.

42. A motor vehicle comprising a body, steering mechanism, an engine having a frame rigidly secured to the body and a crank shaft rotatively mounted in the frame, a road wheel having an annular roller race, a friction transmission member on the crank shaft, interposed rollers between the transmission member and the race, and means dependent upon the steering mechanism for throwing the friction transmission members into and out of driving connection.

43. A motor vehicle comprising a body, steering mechanism, brake mechanism, an engine having a frame rigidly secured to the body, and a crank shaft rotatively mounted in the frame, a road wheel having an annular roller race, a friction transmission member on the crank shaft, interposed rollers between the transmission member and the race, and means for disengaging the transmission member from the rollers and for applying the brake mechanism.

In testimony whereof, I have signed my name to this specification, in the presence of two subscribing witnesses, this 2nd day of March 1915.

ARTHUR HUGO CECIL GIBSON.

Witnesses:
DANIEL J. GUINAN,
H. MUCHMORE.